US011336081B2

(12) United States Patent
Javera et al.

(10) Patent No.: US 11,336,081 B2
(45) Date of Patent: May 17, 2022

(54) PROTECTION CIRCUIT FOR A MEDIUM VOLTAGE OR HIGH VOLTAGE TRANSFORMER

(71) Applicant: ABB Schweiz AG, Baden (CH)

(72) Inventors: Radek Javera, Hrusovany u Brna (CZ); Marek Pavlas, Otnice (CZ)

(73) Assignee: ABB Schweiz AG, Baden (CH)

( * ) Notice: Subject to any disclaimer, the term of this patent is extended or adjusted under 35 U.S.C. 154(b) by 160 days.

(21) Appl. No.: 16/795,604

(22) Filed: Feb. 20, 2020

(65) Prior Publication Data

US 2020/0274349 A1  Aug. 27, 2020

(30) Foreign Application Priority Data

Feb. 22, 2019  (EP) ..................................... 19158959

(51) Int. Cl.
*H02H 7/04* (2006.01)
*H01F 27/40* (2006.01)
*H02H 1/00* (2006.01)

(52) U.S. Cl.
CPC ............ *H02H 7/04* (2013.01); *H02H 1/0007* (2013.01); *H01F 2027/406* (2013.01)

(58) Field of Classification Search
CPC ... H02H 7/04; H02H 1/0007; H01F 2027/406
See application file for complete search history.

(56) References Cited

U.S. PATENT DOCUMENTS

| | | | | |
|---|---|---|---|---|
| 3,666,991 A | * | 5/1972 | Wolf | H02H 9/007 361/35 |
| 4,521,823 A | * | 6/1985 | Link | H01H 71/40 361/14 |
| 4,803,436 A | * | 2/1989 | Kresge | H02H 9/042 324/549 |
| 5,224,011 A | | 6/1993 | Yalla et al. | |
| 5,784,233 A | * | 7/1998 | Bastard | H02H 7/045 361/115 |

(Continued)

FOREIGN PATENT DOCUMENTS

| | | |
|---|---|---|
| CN | 103414155 A | 11/2013 |
| EP | 2693587 A1 | 2/2014 |

(Continued)

*Primary Examiner* — Scott Bauer
(74) *Attorney, Agent, or Firm* — Leydig, Voit & Mayer, Ltd.

(57) ABSTRACT

A protection circuit is for a medium voltage or high voltage transformer and includes a sensing device, a measurement device, and a switching device. The sensing device is configured to be connected between a primary winding of a voltage transformer and ground potential. The measurement device is connected to the sensing device and the measurement device is configured to measure at least one parameter sensed by the sensing device. The protection circuit is configured to analyse the measured at least one parameter sensed by the sensing device. The protection circuit is configured to generate a trip signal based on the analysis of the measured at least one parameter sensed by the sensing device. The switching device is configured to receive the generated trip signal and disconnect the voltage transformer from a high voltage potential.

10 Claims, 3 Drawing Sheets

(56) References Cited

U.S. PATENT DOCUMENTS

2008/0100298 A1* 5/2008 Yun .................. B60L 58/22
    324/430
2011/0128655 A1* 6/2011 Hoch ................. G01R 15/246
    361/20

FOREIGN PATENT DOCUMENTS

| WO | WO 2006126904 A1 | 11/2006 |
| WO | WO 2011036007 A1 | 3/2011 |

* cited by examiner

PROTECTION CIRCUIT FOR A MEDIUM VOLTAGE OR HIGH VOLTAGE TRANSFORMER

CROSS-REFERENCE TO PRIOR APPLICATIONS

Priority is claimed to European Patent Application No. EP 19 158 959.7, filed on Feb. 22, 2019, the entire disclosure of which is hereby incorporated by reference herein.

FIELD

The present invention relates to a protection circuit for a medium voltage or high voltage transformer.

BACKGROUND

Voltage transformers require appropriate protection. In in some cases, a voltage transformer such as an instrument voltage transformer is equipped with a fuse. However, equipping a voltage transformer leads to a bigger and more complex design of voltage transformer, as shown in FIG. 1. Then, where a failure has occurred and the fuse has operated or reacted, the voltage transformer is disconnected from the measured network and it is necessary to manually replace the fuse with a new fuse causing disruption to the circuit and the requirement for manual service actions.

SUMMARY

In an embodiment, the present invention provides a protection circuit for a medium voltage or high voltage transformer. The protection circuit includes a sensing device, a measurement device, and a switching device. The sensing device is configured to be connected between a primary winding of a voltage transformer and ground potential. The measurement device is connected to the sensing device and the measurement device is configured to measure at least one parameter sensed by the sensing device. The protection circuit is configured to analyse the measured at least one parameter sensed by the sensing device. The protection circuit is configured to generate a trip signal based on the analysis of the measured at least one parameter sensed by the sensing device. The switching device is configured to receive the generated trip signal and disconnect the voltage transformer from a high voltage potential.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Another issue relating to voltage transformers is the phenomenon termed ferroresonance. Ferroresonance is a type of resonance in electric circuits, that can occur when a circuit containing a nonlinear inductance is fed from a source that has series capacitance, and the circuit is subjected to a disturbance such as opening of a switch.

Ferroresonance is phenomena that can affect an electric power network, and that can be harmful to all involved devices, such as voltage transformers and can and even lead to their destruction. Several known solutions exists, as described for example in EP2693587A1 and WO2006/126904 and elsewhere.

Figure 1A:
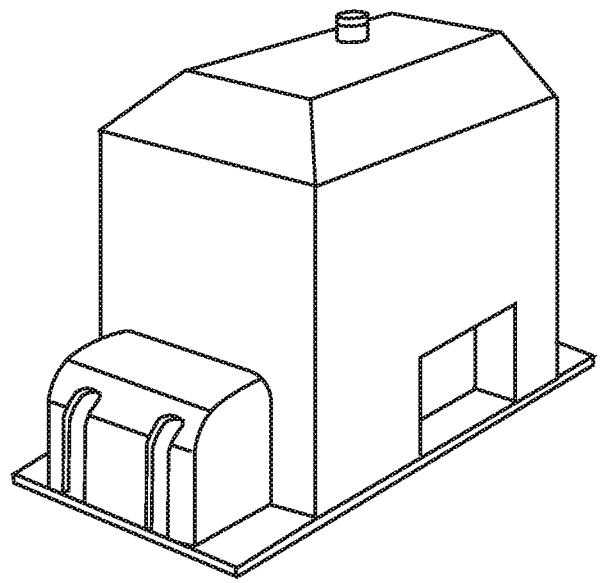
FIGS. 1a and 1b show an example of a known solution for protecting a voltage transformer.
Figure 1B:
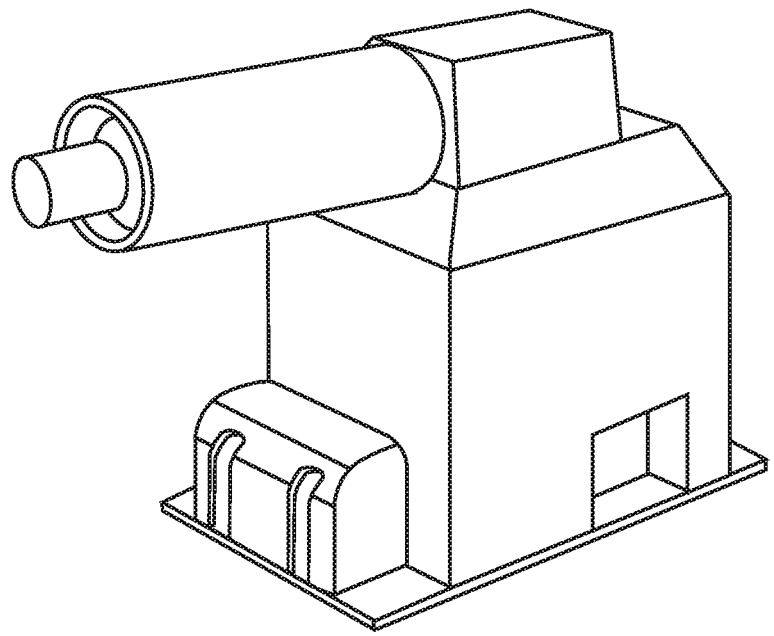
Figure 2A:
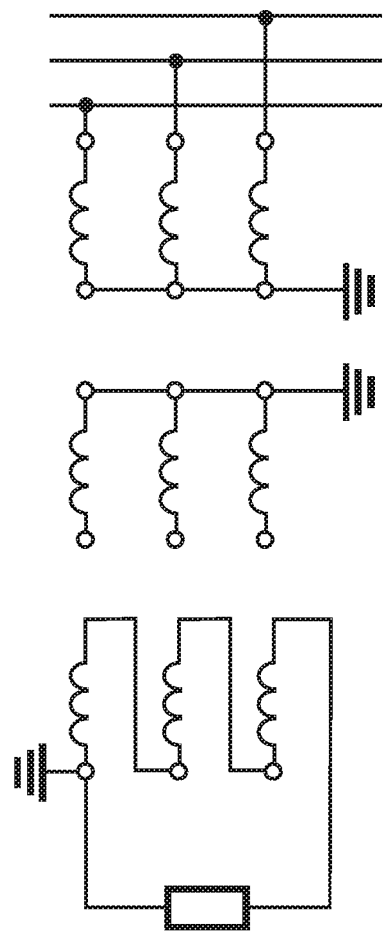
FIGS. 2a and 2b show examples of known solutions for protecting a voltage transformer.
Figure 2B:
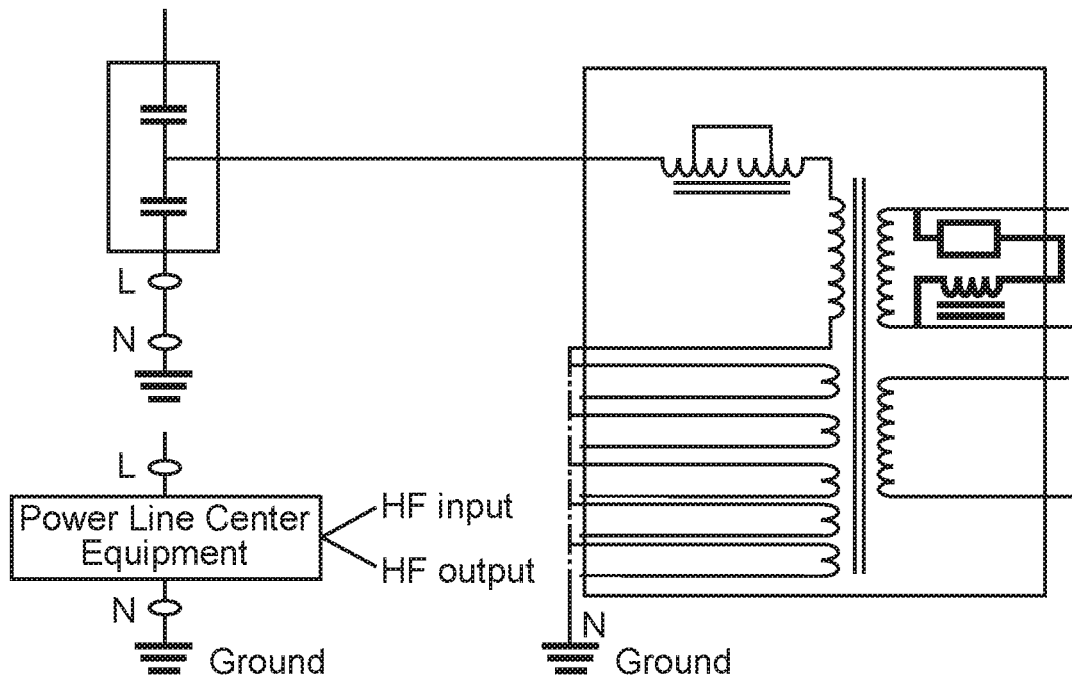

FIG. 2a exemplifies one known solution technique, where an protection device in the form of a resistor (shown in bold) is installed in open-delta terminals of the secondary windings of three voltage transformers. FIG. 2b exemplifies a second known solution, where a damping circuit (shown in bold) is installed in the secondary winding of a phase-to-ground capacitive voltage transformer. All these solutions have to be designed to withstand phase-to-ground fault as well, which may affect efficiency of this solution for Ferroresonance mitigation. Furthermore, it is impossible to determine if the fault is caused by Ferroresonance or a Phase-to-Ground fault, as both phenomena will result in residual voltage appearing in open-delta.

There is a need to address these issues. Therefore, it would be advantageous to have an improved protection for a medium voltage or high voltage transformer.

In an embodiment, there is provided a protection circuit for a medium voltage or high voltage transformer, the protection circuit comprising:
a sensing device;
a measurement device; and
a switching device.

The sensing device is configured to be connected between a primary winding of a voltage transformer and ground potential. The measurement device is connected to the sensing device and the measurement device is configured to measure at least one parameter sensed by the sensing device. The protection circuit is configured to analyse the measured at least one parameter sensed by the sensing device. The protection circuit is configured to generate a trip signal based on the analysis of the measured at least one parameter sensed by the sensing device. The switching device is configured to receive the generated trip signal and disconnect the voltage transformer from a high voltage potential.

In an embodiment, the at least one parameter comprises a voltage measured across the sensing device. In an embodiment, the at least one parameter comprises a measured current. In an embodiment, the analysis of the at least one parameter comprises an analysis of an r.m.s. value of the measured current.

In an embodiment, the analysis of the at least one parameter comprises an analysis of a full waveform of the measured current. In an embodiment, the analysis of the at least one parameter comprises an analysis of a magnitude of the measured current.

In an embodiment, the measurement device comprises a relay or intelligent electronic device or analogue device. In an embodiment, the sensing device comprises a shunt. In an embodiment, the switching device is a circuit breaker or recloser. In an embodiment, the protection circuit comprises overvoltage protection applied in parallel to the sensing device.

In an embodiment, the analysis of the at least one parameter comprises a determination if a phase to ground fault has occurred or a determination if a ferroresonance fault has occurred or a determination if an internal fault in the voltage transformer has occurred.

In an embodiment, the protection circuit is configured to record and/or transmit information relating to whether a phase to ground fault has occurred or whether a ferroresonance fault has occurred or whether an internal fault in the voltage transformer has occurred.

In an embodiment, the measurement device is configured to analyse the measured at least one parameter sensed by the sensing device. The measurement device is configured to generate the trip signal and send the generated trip signal to the switching device.

In an embodiment, the protection circuit comprises a supervisory system connected to the measurement device. The supervisory system is configured to analyse the measured at least one parameter sensed by the sensing device. The supervisory system is configured to generate the trip signal and send the generated trip signal to the switching device.

There is provided a medium voltage or high voltage transformer, comprising an embodiment of at least one protection circuit.

Figure 3:
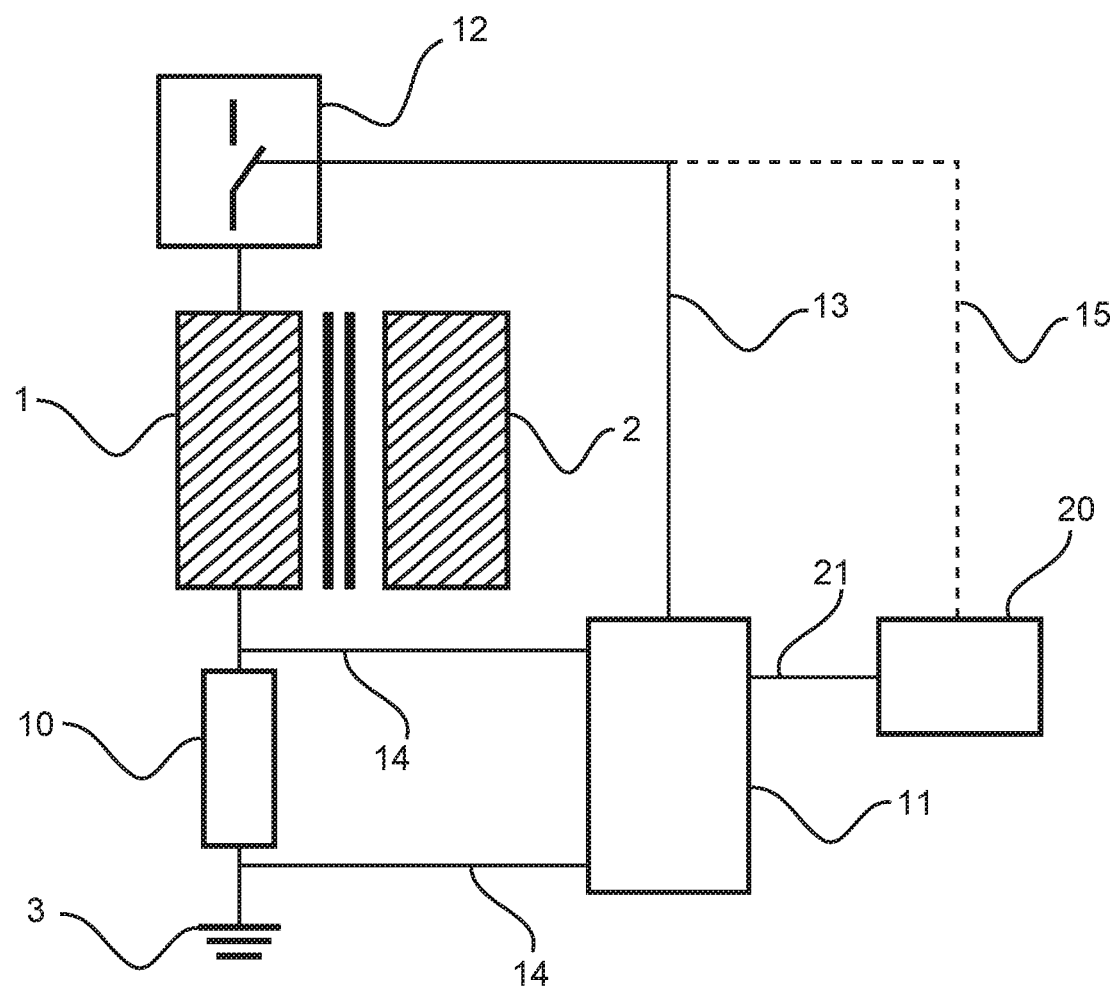
FIG. 3 shows an example of a new protection circuit for a medium voltage or high voltage transformer, according to an embodiment.

FIG. 3 relates to a protection circuit for a medium voltage or high voltage transformer. In an example (i.e., embodiment), the protection circuit comprises a sensing device 10, a measurement device 11, and a switching device 12. The sensing device is configured to be connected between a primary winding of a voltage transformer and ground potential.

The measurement device is connected to the sensing device and the measurement device is configured to measure at least one parameter sensed by the sensing device. The protection circuit is configured to analyse the measured at least one parameter sensed by the sensing device. The protection circuit is configured to generate a trip signal based on the analysis of the measured at least one parameter sensed by the sensing device. The switching device is configured to receive the generated trip signal and disconnect the voltage transformer from a high voltage potential.

According to an example, the at least one parameter comprises a voltage measured across the sensing device. According to an example, the at least one parameter comprises a measured current.

According to an example, the analysis of the at least one parameter comprises an analysis of a root mean square (r.m.s.) value of the measured current. According to an example, the analysis of the at least one parameter comprises an analysis of a full waveform of the measured current.

According to an example, the analysis of the at least one parameter comprises an analysis of a magnitude of the measured current. According to an example, the measurement device comprises a relay or intelligent electronic device or analogue device.

According to an example, the sensing device comprises a shunt. According to an example, the switching device is a circuit breaker or recloser. According to an example, the protection circuit comprises overvoltage protection applied in parallel to the sensing device.

According to an example, the analysis of the at least one parameter comprises a determination if a phase to ground fault has occurred or a determination if a ferroresonance fault has occurred or a determination if an internal fault in the voltage transformer has occurred.

According to an example, the protection circuit is configured to record and/or transmit information relating to whether a phase to ground fault has occurred or whether a ferroresonance fault has occurred or whether an internal fault in the voltage transformer has occurred.

According to an example, the measurement device is configured to analyse the measured at least one parameter sensed by the sensing device. The measurement device is configured to generate the trip signal based on that analysis and send the generated trip signal to the switching device.

According to an example, the protection circuit comprises a supervisory system 20 connected to the measurement device. The supervisory system is configured to analyse the measured at least one parameter sensed by the sensing device. The supervisory system is configured to generate the trip signal based on that analysis and send the generated trip signal to the switching device.

Thus, a medium voltage or high voltage transformer can have installed to it at least one protection circuit as described according to one or more of the examples above.

Thus, the new protection circuit can replace 2 existing devices that are used for the protection of instrument voltage transformers, such as instrument voltage transformers. The devices that the new protection circuit can replace is a fuse that is used in combination with, or that is part of, a voltage transformer, and a second device being replaced is a device used to eliminate or recognize ferroresonance conditions in the network. The new protection circuit can replace both of these at the same time. This is achieved, for example through current sensing linked to evaluation of the amount of current flowing with information for example being provided to a control box or directly to the equipment which will provide necessary switching. Also, a determination can be made as what fault triggered the switching, facilitating remedial action to ensure that the fault does not re-occur.

A specific detailed example of a protection circuit for a medium voltage or high voltage transformer is now described, again with reference to FIG. 3. FIG. 3 shows the primary winding 1 and secondary winding 2 of a voltage transformer. A current sensing (or measurement) device 10, for example a shunt, is connected between the primary winding 1 and the ground 3. The voltage measured over the shunt 10, by at least one wire 14, is analysed by a measurement device 11.

However, rather than the measurement device analysing the voltage a supervisory system 20 can carry out this analysis. If the measurement device 11 itself, or its supervisory system 20 receiving a signal from measurement device 11 by connection 21, recognizes any kind of fault state that may affect the voltage transformer, it can send a tripping command or trip signal to the switching device 12, for example a circuit breaker. This can be either through command 13 from the measurement device or alternatively from the supervisory system 20 through command 15. The command is used by the circuit breaker to disconnect the voltage transformer from the line/high voltage and thus prevent damage or destruction of the voltage transformer.

Disconnection also modifies the value of inductance present in the circuit and thus cancels any possible previous ferroresonance condition. The measurement device 11 or its supervisory system 20 analyses the signal and based on a value of detected current decides if the fault type is phase-to-ground (typically very low currents) or ferroresonance (higher currents). The device 11 or system 20 can also react in the situation of internal fault of the voltage transformer, resulting in higher current flowing through the shunt 10 with different/less harmonic distortions compared to the previous fault cases. Thus, all of these fault cases can be distinguishing one from the other. The tripping command sent to switching device 12 can disconnect the voltage transformer in the same way as conventional fuse would do.

The connection 21 between the measurement device 11 and the supervisory system 20 can be in either analogue or digital form and wired or wireless, ensuring fast, reliable and precise transfer of the required information. The sensing device 10 can be either cast in the body of the voltage transformer, or can be connected outside of the insulated casting. The shunt 10 being part of each single phase-to-ground voltage is more reliable, and can provide more precise information about the fault condition, compared to the traditional ferroresonance damping solution connected to open-delta connection of secondary windings of three single-phase VTs.

Additionally, overvoltage protection can be connected in parallel to the shunt 10, in order to secure the connected measuring device in case of dielectric breakdown inside/outside the voltage transformer.

Thus, as discussed above the described new solution enables fuses in a primary circuit as well as Ferroresonance damping devices to be replaced, through the use of current/voltage sensing/measurement directly in the primary circuit of the voltage transformer. A preferred embodiment of such solution is to use resistor/shunt connected between the voltage transformer primary winding and ground, providing for a solution that is small, as the applied voltage is low. By measuring voltage over a shunt with a known value, the current flowing through primary winding of the voltage transformer can be precisely calculated.

Such current value and its waveform can help to precisely determine if the fault is caused by phase-to-ground fault or ferroresonance (fault current is typically bigger than during phase-to-ground fault). Furthermore, the same solution enables to a fuse from the primary winding to be removed. For example, when the shunt is connected to an evaluation device that has a reaction time fast enough to send the tripping command to the circuit breaker that can disconnect the circuit early enough, before disruption of the voltage transformer has occurred.

Referring to FIG. 3, an embodiment of the present invention provides a protection circuit for a medium voltage or high voltage transformer. The protection circuit comprises a sensing device 10, a measurement device 11 and a switching device 12. The sensing device is configured to be connected between a primary winding of a voltage transformer and ground potential. The measurement device is connected to the sensing device and the measurement device is configured to measure at least one parameter sensed by the sensing device. The protection circuit is configured to analyse the measured at least one parameter sensed by the sensing device. The protection circuit is configured to generate a trip signal based on the analysis of the measured at least one parameter sensed by the sensing device. The switching device is configured to receive the generated trip signal and disconnect the voltage transformer from a high voltage potential.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A protection circuit for a medium voltage or high voltage transformer, the protection circuit comprising:
   a sensing device;
   a measurement device; and
   a switching device;
   wherein the sensing device comprises a resistor or shunt and is configured to be connected between a primary winding of a voltage transformer and ground potential;
   wherein the measurement device is connected to the sensing device and the measurement device is configured to measure a plurality of parameters sensed by the sensing device, wherein the plurality of parameters comprises at least a voltage measured across the sensing device and a current flowing through the primary winding of the voltage transformer derived from the voltage measured across the sensing device and a resistance of the sensing device;
   wherein the protection circuit is configured to perform an analysis of the measured plurality of parameters sensed by the sensing device, the analysis comprising a current magnitude analysis and a waveform analysis to determine an occurrence or a non-occurrence of each of:
   a phase to ground fault;
   a ferroresonance fault; and
   an internal fault in the voltage transformer;
   wherein the protection circuit is configured to generate a trip signal based on the analysis of the measured at least one parameter sensed by the sensing device; and
   wherein the switching device is configured to receive the generated trip signal and disconnect the voltage transformer from a medium or high voltage potential.

2. The protection circuit according to claim 1, wherein the analysis of the at least one parameter comprises an analysis of an r.m.s. value of the measured current.

3. The protection circuit according to claim 1, wherein the analysis of the at least one parameter comprises an analysis of a full waveform of the measured current.

4. The protection circuit according to claim 1, wherein the measurement device comprises a relay or intelligent electronic device or analogue device.

5. The protection circuit according to claim 1, wherein the switching device is a circuit breaker or recloser.

6. The protection circuit according to claim 1, wherein the protection circuit comprises overvoltage protection applied in parallel to the sensing device and wherein the protection circuit is configured to protect the measuring device in case of dielectric breakdown inside or outside the voltage transformer.

7. The protection circuit according to claim 1, wherein the protection circuit is configured to record and/or transmit information relating to whether a phase to ground fault has occurred or whether a ferroresonance fault has occurred or whether an internal fault in the voltage transformer has occurred.

8. The protection circuit according to claim 1, wherein the measurement device is configured to analyse the measured at least one parameter sensed by the sensing device, and wherein the measurement device is configured to generate the trip signal and send the generated trip signal to the switching device.

9. The protection circuit according to claim 1, wherein the protection circuit comprises a supervisory system connected to the measurement device, wherein the supervisory system is configured to analyse the measured at least one parameter sensed by the sensing device, and wherein the supervisory system is configured to generate the trip signal and send the generated trip signal to the switching device.

10. A medium voltage or high voltage transformer, comprising at least one protection circuit according to claim 1.

* * * * *